Patented Mar. 25, 1947

2,417,975

UNITED STATES PATENT OFFICE 2,417,975

COMPOSITION CONTAINING ALKALINE LATEX AND RESORCINOL-FORMALDEHYDE-AMINE-RESIN

Earle S. Ebers, Nutley, N. J., assignor to United States Rubber Company, New York, N. Y., a corporation of New Jersey No Drawing. Application November 8, 1941, Serial No. 418,329

10 Claims. (Cl. 260—3)

This invention relates to latex compositions containing potentially reactive resorcinol-formaldehyde-amine resins, and articles comprising plies or fibrous material and vulcanized rubber bonded to the fibrous material with the dried deposit of such compositions.

Resorcinol, formaldehyde, and primary or secondary amines have been reacted in aqueous media to form water-insoluble resins. These resins are soluble in acetic acid and in ammonium hydroxide. See Harmon et al. Patent 2,098,869, Example 2, and Meigs Patent 2,211,960, Example H, where such a resin is produced by the reaction of one mol of resorcinol, one mol of formaldehyde, and .5 mol of methylamine. Meigs Patent 2,211,960, suggests dissolving such resins in an organic acid and adding the resulting solution to a stabilized acid latex containing a protective such as ammonium caseinate, to prepare a latex adhesive to be used for bonding rubber to fibrous material, as in the manufacture of tire casings. Such acidification of the latex is undesirable since it necessitates a complete change in the normal compounding technique that is usually practiced in the compounding of alkaline latices. Dissolving the resin in ammonia and adding the ammoniacal solution to an alkaline latex composition is also unsatisfactory because the large amount of added ammonia, necessary to dissolve the resin, reacts with the zinc oxide usually present as a vulcanizing ingredient so as to destabilize the latex composition.

The present invention more particularly concerns the preparation of a resorcinol-formaldehyde-amine resin which is soluble in the aqueous medium in which the reaction takes place, and which solution of the resin may be added to alkaline latex without precipitation of the resin or coagulation of the latex.

According to the present invention there is reacted in an aqueous medium resorcinol and formaldehyde and a sufficient amount of a primary or secondary aliphatic amine to form an aqueous solution of a potentially reactive resin, which latter may be added directly to an alkaline latex without causing precipitation of the resin or coagulation of the latex. I have found that the resorcinol-formaldehyde-amine resin is soluble in the aqueous medium in which the reaction takes place if at least 0.65 mol of amine is present for each mol of formaldehyde which combines with the resorcinol. In these reactions a maximum of approximately two mols of formaldehyde combines with each mol of resorcinol; so that if there is present in the aqueous medium at least two mols of formaldehyde for every mol of resorcinol, there must also be present during the reaction at least 1.3 mols of amine if the product is to remain in solution. If a smaller proportion of amine is present during the reaction, so that a precipitate is formed, then a sufficient amount must be added after the reaction to bring the ratio of amine to resorcinol to at least 1.3 to 1 to obtain an aqueous solution of the resin. If, however, there is present less than 2 mols of formaldehyde for each mol of resorcinol, all the formaldehyde can combine with the resorcinol and so there must be prsent at least 0.65 mol of amine per mol of formaldehyde for the resin to remain in solution. For example, with one mol of formaldehyde and one mol of resorcinol, .65 to 1 mol of amine will give a solution of the resin. In some cases, where the amount of amine is near the minimum ratio of 0.65 mol of amine per mol of formaldehyde which combines with the resorcinol, a precipitate may form towards the end of the reaction, but this will redissolve if allowed to stand for a few hours. When one or more mols of the amine are present for each mol of formaldehyde which reacts with the resorcinol, any precipitate that may be formed during the reaction generally redissolves immediately. For economic reasons, the preferred proportion of reactants is at least 2 mols of formaldehyde for each mol of resorcinol, and at least 2 mols of amine for each mol of resorcinol. This assures the formation of a resin which is immediately re-dissoluble in the aqueous medium. There may be as much as 4 or 5 mols of formaldehyde and of amine for each mol of resorcinol. Any primary or secondary water soluble aliphatic amine may be reacted with resorcinol and formaldehyde to produce such resins, for example, monomethylamine, monoethylamine, dimethylamine, diethylamine, n-propylamine, iso-propylamine, di-n-propylamine, di-iso-propylamine. The amount of resin added to the latex preferably corresponds to 1 to 10 parts of resorcinol in the resin per 100 parts of rubber in the latex.

The following examples (in which parts are given by weight) are included as further illustrations of the invention but not as limitations thereon:

Example I

Solution A was prepared by dissolving 100 parts (.9 mol) of resorcinol in 180 parts of 25% aqueous dimethylamine (1 mol of dimethylamine). Solution B was prepared by mixing 100 parts of 25% aqueous dimethylamine (.56 mol of dimethylamine) and 225 parts of 35.6% aqueous formaldehyde (2.7 mols formaldehyde). Solution B was chilled to below 5° C. by means of an ice bath, and solution A was added to solution B slowly with constant stirring while the temperature was not permitted to rise above 25° C. After the mixing was completed, the cooling bath was removed and the mixture allowed to come to room temperature. At this stage the resorcinol-formaldehyde-amine mixture was a clear reddish brown solution free from any precipitate. The pH of the solution was above 8.5. If allowed to stand at room temperature, the concentrated mixture would have continued to resinify and would ultimately, in from 5 to 10 hours, have gelled to form a tough transparent red infusible resin which would not be soluble in water. If, however, the mixture, before it has a chance to gel, be sufficiently diluted with water as by adding it to a latex compound, a stable solution of the resin will result. Therefore, before the solution had a chance to gel, it was added to an alkaline latex compound to form a latex-resin compound of the following composition:

| | Parts by weight |
|---|---|
| Rubber (as 60% concentrated alkaline latex) | 100 |
| Sulphur | 2.5 |
| Zinc oxide | 2.5 |
| Accelerator (mercaptobenzothiazole) | .5 |
| Antioxidant | 1 |
| Resin solution formed as above | 15.1 |
| Water to give total solids of 20% | |

The amount of resin solution used corresponds to 2.5 parts resorcinol per 100 parts of rubber.

Such latex-and-resin compositions are valuable as adhesives in uniting rubber to plies of fibrous material, such as cotton and rayon, in the manufacture of tire carcasses, belting, hose, and the like. Such articles show improved fatigue resistance over those made using latex compositions without the resin, as shown below.

A weftless fabric having 26 ends per inch was prepared from cotton tire cords. The cords were made by twisting to the left, 10 turns per inch, three plied yarns, each composed of 5 ends of a 13 cotton yarn twisted 20 turns per inch to the right. A large number of these cords held in parallel alignment to form a sheet were passed through the above latex-resin webbing solution, thence under a doctor blade, and over a series of drying cans, to form a sheet of weftless tire fabric. The rate at which the cords passed through the webbing solution was so adjusted that the dried fabric contained 10 to 15% of solids from the webbing solution. The rubberized fabric was then skim-coated equally on both sides with the following rubber composition to give a total gauge of 0.05 inch:

| | Parts by weight |
|---|---|
| Smoked sheet | 100 |
| Zinc oxide | 40 |
| Sulphur | 3.5 |
| Pine tar | 2 |
| Stearic acid | 2 |
| Antioxidant | 1.5 |
| Accelerator (mercaptobenzothiazole) | .5 |

Six-ply pads made from the skim-coated fabric were tested by the flexing test commonly used as a measure of fatigue resistance as described in the article by Gibbons in Industrial & Engineering Chemistry, vol. 2, p. 99, January 15, 1930. The flexing pads were found to have an average flexing life of around 200 kilocycles, compared with 40 to 50 kilocycles for similar flexing pads made from cotton cords treated with the latex compound without the resin.

Flexing pads were also made from a rayon fabric of the following construction: Cords were made by twisting 120 rayon filaments of size 275 denier 4 turns per inch to the right (giving a yarn equivalent in weight to about 21 cotton yarn); 4 strands of this yarn were twisted 18.3 turns per inch to the left to give a plied yarn; and 2 strands of the plied yarn were cable twisted 10.8 turns per inch to the right to form the cord. The cords were woven into a fabric having 35 ends of cord per inch as warp, and 2½ picks per inch of a light, weak thread as weft. This fabric was impregnated with a latex-resin webbing solution similar to the above latex-resin compound but containing an amount of the resin corresponding to 5.5 parts of resorcinol per 100 parts of rubber. The rate at which the fabric was passed through the webbing solution was so adjusted that the dried fabric contained 10 to 15% of solids from the webbing solution. The thus rubberized fabric was then skim-coated with the above skim compound and made into conventional 6-ply flexing pads. These flexing pads were found to have an average flexing life of around 600 kilocycles, compared with less than 20 kilocycles for similar flexing pads made with rayon fabric treated with the latex compound without the amine-resorcinol-formaldehyde resin.

*Example II*

A resin solution of the following composition was prepared according to the procedure followed in Example I with solutions C and D substituting solutions A and B respectively:

| Solution C: | Parts by weight |
|---|---|
| Resorcinol (2.3 mols) | 250 |
| Diethylamine (2.5 mols) | 181 |
| Water | 544 |
| Solution D: | |
| Formaldehyde (6.7 mols) | 200 |
| Diethylamine (.7 mol) | 50 |
| Water | 1490 |

The freshly prepared C-D resin solution was compounded with a latex composition similar to Example I, in amount corresponding to 2.5 parts of resorcinol per 100 parts of rubber. Flexing pads containing cotton cords webbed with this latex-resin compound and made and tested by the methods described in Example I, showed an average flexing life of about 300 kilocycles.

*Example III*

A resin solution of the following composition was prepared according to the procedure followed in Example I with solutions E and F substituting solutions A and B respectively:

| Solution E: | Parts by weight |
|---|---|
| Resorcinol (1 mol) | 110 |
| Water | 150 |
| Solution F: | |
| Monomethylamine (2 mols) | 62 |
| Formaldehyde (2 mols) | 60 |
| Water | 317 |

Cotton cords webbed with a latex compound similar to that of Example I, but containing an amount of E-F resin equivalent to 2.5 parts of resorcinol per 100 parts of rubber, were made into flexing pads and tested as in Example I. These pads showed an average flexing life of about 150 kilocycles.

Example IV

A resin solution of the following composition was prepared according to the procedure followed in Example I with solutions G and H substituting solutions A and B respectively:

Solution G:

| | Parts by weight |
|---|---|
| Resorcinol (2.3 mols) | 250 |
| Water | 812 |

Solution H:

| | |
|---|---|
| Formaldehyde (6.2 mols) | 187 |
| Monoethylamine (7.3 mols) | 327 |
| Water | 970 |

Cotton cords webbed with a latex compound similar to that of Example I, but containing an amount of G-H resin equivalent to 2.5 parts of resorcinol per 100 parts of rubber, were made into flexing pads and tested as in Example I. These pads showed an average flexing life of about 120 kilocycles.

These examples show that when the amount of formaldehyde present is not less than the maximum amount which will react with all the resorcinol present, (i. e. not less than two mols of formaldehyde per mol of resorcinol), the resulting resin is soluble in the aqueous medium, provided that the molar ratio of amine to resorcinol is at least 1.3:1. When there is present at least two mols of formaldehyde per mol of resorcinol, and the molar ratio of amine to resorcinol is less than 1.3:1, as when the ratio is 1:1, an insoluble precipitate is formed which will not redissolve over night. When the amount of formaldehyde present is less than the maximum amount which will react with all the resorcinol present (i. e., less than two mols of formaldehyde per mol of resorcinol), the requisite amount of amine to insure the formation of a dilutable resin is at least 0.65 mol of amine per mol of formaldehyde, any lesser proportion of amine resulting in an insoluble precipitate.

Example H of Meigs Patent 2,211,960 and Example 2 of Harmon et al. Patent 2,098,869 are illustrative of resins made using an amount of amine which is less than the amount necessary to give a soluble product. Both examples show the preparation of a resin by reacting one mol of resorcinol with 0.5 mol of methylamine and one mol of formaldehyde. The product in each case is a light-colored water-insoluble precipitate which will not dissolve in the aqueous medium over night. Since there are less than two mols of formaldehyde per mol of resorcinol, the .5 mol of methylamine represents less than the necessary 0.65 mol per mol of reactable formaldehyde, and it can be seen that there is insufficient amine to give a soluble resin. If the molar proportions of the methylamine and formaldehyde are doubled to give a ratio of 1 mol of resorcinol to 1 mol of methylamine to 2 mols of formaldehyde, which is in effect the preferred molar ratio set forth in the Harmon et al. Patent 2,098,869, there will then be present the maximum amount of formaldehyde which can react with all the resorcinol, but the ratio of methylamine to resorcinol will be only 1:1, which is less than the necessary 1.3:1. In this case also a precipitate will be obtained which will not redissolve over night.

If, however, only the proportion of amine in Example H of Meigs 2,211,960 is doubled so that the proportions of the reactants are approximately 1 mol of resorcinol to 1 mol of methylamine to 1 mol of formaldehyde, there is obtained in the reaction a light colored precipitate which dissolves, after standing several hours, to give a red viscous solution which can be diluted with water or added to latex without precipitation. In such a case there is present less than the two mols of formaldehyde which can react with the resorcinol present, but the molar ratio of methylamine to reactable formaldehyde has been increased to 1:1 according to the present invention. When the amine is increased over the preferred molar proportion in Harmon et al. Patent 2,098,869, i. e., 1 mol of resorcinol to 1 mol of methylamine to 2 mols of aldehyde, sufficiently to bring the amine resorcinol ratio above 1.3:1, as for example where the resin is prepared with proportions of 1 mol of resorcinol to 1.5 mols of methylamine to 2 mols of formaldehyde, or 1 mol of resorcinol to 1.8 mols of methylamine to 2 mols of formaldehyde, a light colored precipitate is formed which in each case dissolves after several hours to form a solution of the resin. When the methylamine is still further increased, as for example by preparing resins having the proportions of 1 mol of resorcinol to 2 mols of methylamine to 2 mols of formaldehyde, or 1 mol of resorcinol to 3.2 mols of methylamine to 2.9 mols of formaldehyde, any precipitate formed during the reaction is immediately redissolved, and it is not necessary to wait for the resin to dissolve in the aqueous medium. When the lower ratios of amine to resorcinol are used in forming the resin and the resin is slow in redissolving, the dissolution of the resin in the aqueous medium may be speeded up by adding more amine. Dilution of the resin solution without formation of a precipitate may be used as a test to show when the resin solution can safely be added to a latex compound.

In view of the many changes and modifications that may be made without departing from the principles underlying the invention, reference should be made to the appended claims for an understanding of the scope of the invention.

Having thus described my invention, what I claim and desire to protect by Letters Patent is:

1. The process which comprises reacting in an aqueous medium as the sole reacting ingredients resorcinol, formaldehyde and an amine selected from the group consisting of monomethylamine, monoethylamine, dimethylamine, diethylamine, n-propylamine, iso-propylamine, di-n-propylamine, and di-iso-propylamine, 2 to 5 mols of formaldehyde and 1.3 to 5 mols of amine being present for each mol of resorcinol, to form an alkaline aqueous solution of a potentially reactive resin, and mixing said resin while in such dissolved state with alkaline latex.

2. The process which comprises reacting in an aqueous medium as the sole reacting ingredients resorcinol, formaldehyde and monomethylamine, 2 to 5 mols of formaldehyde and 1.3 to 5 mols of amine being present for each mol of resorcinol, to form an alkaline aqueous solution of a potentially reactive resin, and mixing said resin while in such dissolved state with alkaline latex.

3. The process which comprises reacting in an aqueous medium as the sole reacting ingredients resorcinol, formaldehyde and dimethylamine, 2 to 5 mols of formaldehyde and 1.3 to 5 mols of amine being present for each mol of resorcinol, to form an alkaline aqueous solution of a potentially reactive resin, and mixing said resin while in such dissolved state with alkaline latex.

4. The process which comprises reacting in an aqueous medium as the sole reacting ingredients resorcinol, formaldehyde and diethylamine, 2 to 5 mols of formaldehyde and 1.3 to 5 mols of amine being present for each mol of resorcinol, to form an alkaline aqueous solution of a potentially reactive resin, and mixing said resin while in such dissolved state with alkaline latex.

5. The process which comprises reacting in an aqueous medium as the sole reacting ingredients, resorcinol, formaldehyde and an amine selected from the group consisting of monomethylamine, monoethylamine, di-methylamine, diethylamine, n-propylamine, iso-propylamine, di-n-propylamine, and di-iso-propylamine, 1 to 5 mols of formaldehyde and 0.65 to 5 mols of amine being present for each mol of resorcinol, and at least 0.65 mols of amine being present for each mol of formaldehyde not in excess of 2, to form an alkaline aqueous solution of a potentially reactive resin, and mixing said resin while in such dissolved state with alkaline latex.

6. The process which comprises reacting in an aqueous medium as the sole reacting ingredients, resorcinol, formaldehyde and dimethylamine, 1 to 5 mols of formaldehyde and 0.65 to 5 mols of amine being present for each mol of resorcinol, the molar ratio of amine to that amount of formaldehyde present which combines with the resorcinol being at least 0.65, not more than 2 mols of formaldehyde combining with one mol of resorcinol, to form an alkaline aqueous solution of a potentially reactive resin, and mixing said resin while in such dissolved state with alkaline latex.

7. The product of the process of claim 6.
8. The product of the process of claim 3.
9. The product of the process of claim 5.
10. The product of the process of claim 1.

EARLE S. EBERS.

REFERENCES CITED

The following references are of record in the file of this patent:

UNITED STATES PATENTS

| Number | Name | Date |
|---|---|---|
| 2,098,869 | Harmon | Nov. 9, 1937 |
| 2,211,951 | Hershberger | Aug. 20, 1940 |
| 2,211,960 | Meigs | Aug. 20, 1940 |